(12) United States Patent
Cai et al.

(10) Patent No.: US 12,008,253 B2
(45) Date of Patent: Jun. 11, 2024

(54) EMBEDDED SYSTEM AND METHOD FOR UPDATING FIRMWARE

(71) Applicant: REALTEK SEMICONDUCTOR CORPORATION, Hsinchu (TW)

(72) Inventors: Ya-Kun Cai, Suzhou (CN); Hong Chang, Suzhou (CN); Wen-Juan Ni, Suzhou (CN)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 22 days.

(21) Appl. No.: 17/966,002

(22) Filed: Oct. 14, 2022

(65) Prior Publication Data
US 2023/0152998 A1    May 18, 2023

(30) Foreign Application Priority Data
Nov. 17, 2021    (CN) .......................... 202111358982.8

(51) Int. Cl.
*G06F 3/06* (2006.01)
*G06F 8/65* (2018.01)

(52) U.S. Cl.
CPC ............ *G06F 3/064* (2013.01); *G06F 3/0607* (2013.01); *G06F 8/65* (2013.01); *G06F 3/0673* (2013.01)

(58) Field of Classification Search
CPC ...... G06F 3/0607; G06F 3/0629; G06F 3/064; G06F 3/0673; G06F 8/65
See application file for complete search history.

(56) References Cited

U.S. PATENT DOCUMENTS

| 2010/0211699 A1 | 8/2010 | Chang |
| 2011/0119662 A1 | 5/2011 | Chen |
| 2016/0210140 A1* | 7/2016 | Meng ..................... G06F 8/654 |
| 2021/0294590 A1 | 9/2021 | Chen |

FOREIGN PATENT DOCUMENTS

| TW | 201017533 A | 5/2010 |
| TW | 201031244 A | 8/2010 |
| TW | 201118731 A | 6/2011 |
| TW | 202137007 A | 10/2021 |

* cited by examiner

*Primary Examiner* — Yong J Choe
(74) *Attorney, Agent, or Firm* — WPAT, P.C.

(57) ABSTRACT

An embedded system includes a host controller circuit and a microcontroller circuit. The host controller circuit is configured to access a storage device to obtain an address of a first firmware file in the storage device. The microcontroller circuit is configured to determine whether a memory circuit is being accessed by other circuits, in which the memory circuit includes memory blocks. If the memory circuit is not being accessed by the other circuits, the microcontroller circuit is further to control the host controller circuit to write the first firmware file to a first block of the memory blocks according to the address.

18 Claims, 6 Drawing Sheets

EMBEDDED SYSTEM AND METHOD FOR UPDATING FIRMWARE

BACKGROUND OF THE INVENTION

1. Field of the Invention

The present disclosure relates to an embedded system, especially to an embedded system that is able to update firmware in background and a firmware updating method thereof.

2. Description of Related Art

In existing approaches, a specific burning tool (hardware) is used to transmit a new firmware to an embedded system. Alternatively, in other approaches, a computer is required to be connected to the embedded system, in order to utilize burning software to update the firmware. In above approaches, additional hardware or software are required to update the firmware of the embedded system, which causes some inconvenience to users. In addition, in the current firmware update procedure, the original operation or function of the system may be affected, which also causes inconvenience to users.

SUMMARY OF THE INVENTION

In some aspects of the present disclosure, an embedded system includes a host controller circuit and a microcontroller circuit. The host controller circuit is configured to access a storage device to obtain an address of a first firmware file in the storage device. The microcontroller circuit is configured to determine whether a memory circuit is being accessed by other circuits, in which the memory circuit includes a plurality of memory blocks, and if the memory circuit is not being accessed by the other circuits, the microcontroller circuit is further to control the host controller circuit to write the first firmware file to a first block of the plurality of memory blocks according to the address.

In some aspects of the present disclosure, a firmware updating method includes the following operations: accessing, by a host controller circuit, a storage device to obtain an address of a first firmware file in the storage device; determining whether a memory circuit is being accessed by other circuits, wherein the memory circuit comprises a plurality of memory blocks; and writing, by the host controller circuit, the first firmware file to a first block of the plurality of memory blocks according to the address if the memory circuit is not being accessed by the other circuits.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
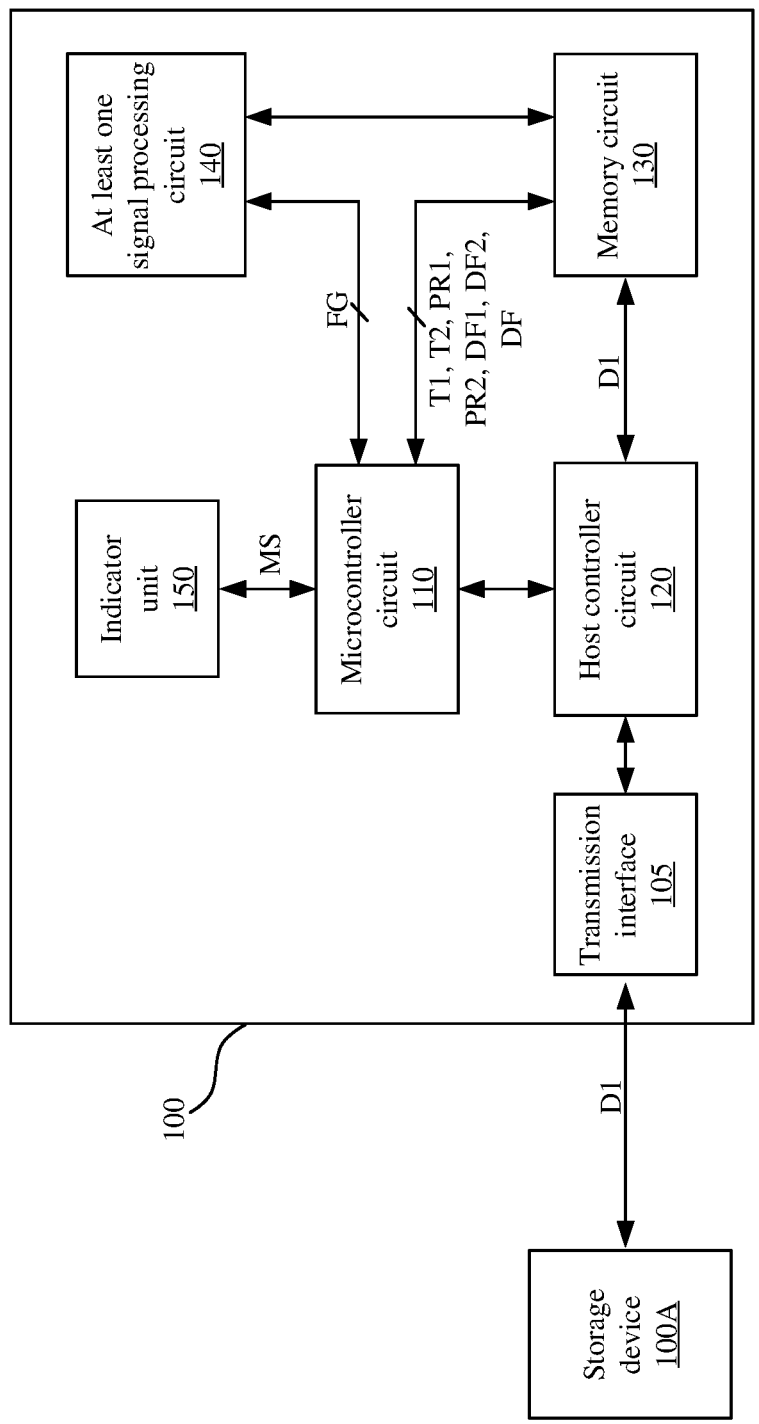
FIG. 1 illustrates a schematic diagram of an embedded system according to some embodiments of the present disclosure.

FIG. 1 illustrates a schematic diagram of an embedded system 100 according to some embodiments of the present disclosure. The embedded system 100 may be applied to various electronic devices. For example, the embedded system 100 may be applied to, but not limited to, an image processing device. In some embodiments, image processing device may include a translator and a monitor, but the present disclosure is not limited thereto.

The embedded system 100 includes a transmission interface 105, a microcontroller (MCU) circuit 110, a host controller circuit 120, a memory circuit 130, at least one signal processing circuit 140, and an indicator unit 150. According to practical application(s), the at least one signal processing circuit 140 may be other circuits in the system. For example, if the embedded system 100 is applied to an image processing device, the at least one signal processing circuit 140 may include, but not limited to, an image encoder circuit, an image decoder circuit, a frame rate converter circuit, a scaler circuit, a timing controller circuit, and so on. The microcontroller circuit 110 is configured to control operations of the host controller circuit 120, the memory circuit 130, the at least one signal processing circuit 140, and the indicator unit 150, and receive at least one flag FG from the at least one signal processing circuit 140. The at least one flag FG may indicate whether the at least one signal processing circuit 140 is accessing the memory circuit 130.

For example, if the at least one signal processing circuit 140 is accessing the memory circuit 130, the at least one signal processing circuit 140 may transmit the at least one flag FG having a first logic value (e.g., a logic value of 1) to the microcontroller circuit 110. Alternatively, if the at least one signal processing circuit 140 is not accessing the memory circuit 130, the at least one signal processing circuit 140 may transmit the at least one flag FG having a second logic value (e.g., a logic value of 0) to the microcontroller circuit 110. The microcontroller circuit 110 includes at least one register (not shown), which may store the at least one flag FG. As a result, the microcontroller circuit 110 may determine whether the memory circuit 130 is being accessed according to the at least one flag FG.

The host controller circuit 120 is connected to a storage device 100A, in order to obtain firmware file D1 in the storage device 100A, and to write the firmware file D1 to the memory circuit 130. As a result, the firmware of the embedded system 100 can be updated. In some embodiments, the host controller circuit 120 may actively detect whether a firmware file to be updated (e.g., the firmware file D1) is stored in the storage device 100A. If the storage device 100A stores the firmware file D1 and the memory circuit 130 is not being accessed, the microcontroller circuit 110 may control the host controller circuit 120 to start writing the firmware file D1 to the memory circuit 130.

The host controller circuit 120 may be coupled to the storage device 100A via the transmission interface 105. For example, the transmission interface 105 may be a universal serial bus (USB), the host controller circuit 120 may be a USB host controller circuit and the storage device 100A may be a storage device having a USB connector (which may be, for example but not limited to, a flash drive, a portable storage device, and so on). User(s) may store the firmware file D1 to be updated in the storage device 100A and connect the storage device 100A with the embedded system 100. After the storage device 100A is connected, the host controller circuit 120 may access the storage device 100A, in order to acquire all storage address of the firmware file D1 in the storage device 100A. As a result, the host controller circuit 120 may write the firmware file D1 to the memory circuit 130 according to the storage addresses, in order to updated firmware. In some embodiments, the host controller circuit 120 may utilize a bulk transfer protocol of a USB 2.0 communication standard to transmit the firmware file D1 to the memory circuit 130. Detailed operations regarding herein will be provided with reference to FIG. 3A and FIG. 3B.

The types of the transmission interface 105, the host controller circuit 120, the storage device 100A, and/or the transmission protocol are given for illustrative purposes, and the present disclosure is not limited thereto. For example, in some other embodiments, the host controller circuit 120 may transmit the firmware file D1 to the memory circuit 130 based on a successor version of USB 2.0 or other types of transmission interface.

The memory circuit 130 is configured to store the firmware of the embedded system 100 (labeled as firmware file DF), and time information T1 relevant to the firmware file D1, time information T2 relevant to the firmware file DF, a state value DF1, a state value DF2, a priority value PR1, and a priority value PR2. In some embodiments, the memory circuit 130 may be, but not limited to, a flash memory circuit, which may include memory blocks. The host controller circuit 120 may write the firmware file D1 to an idle memory block in the memory blocks (e.g., a memory block 503 in FIG. 5A). Detailed operations regarding herein will be provided with reference to FIG. 5A and FIG. 5B.

In some embodiments, the microcontroller circuit 110 may issue an indication signal MS, in order to control the indicator unit 150 to indicate a connection state of the storage device 100A and a state of writing the firmware file D1. Relevant operations and arrangements about the indicator unit 150 will be described with reference table 1 and table 2.

Figure 2:
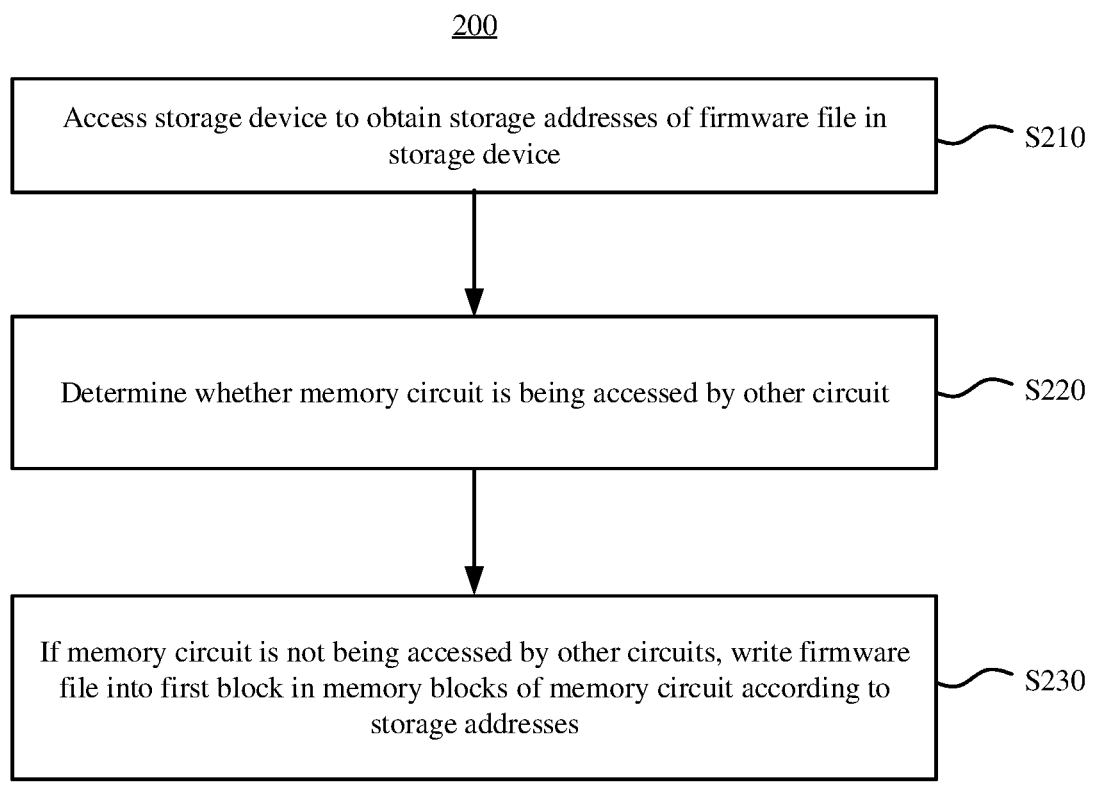
FIG. 2 illustrates a flow chart of a firmware updating method according to some embodiments of the present disclosure.

FIG. 2 illustrates a flow chart of a firmware updating method 200 according to some embodiments of the present disclosure. In some embodiments, the microcontroller circuit 110 may cooperate with the host controller circuit 120 and the memory circuit 130, in order to perform operations in FIG. 2 to update firmware. For example, operations in FIG. 2 may be implemented with firmware or software of the embedded system 100, and the microcontroller circuit 110 may execute the firmware or the software to perform the firmware updating method 200 and control the host controller circuit 120 and/or the memory circuit 130 to update firmware.

In operation S210, a storage device (e.g., the storage device 100A), is accessed to obtain storage addresses of a firmware file (e.g., the firmware file D1) in the storage device. In operation S220, whether a memory circuit (e.g., the memory circuit 130) is being accessed by other circuits (e.g., the at least one signal processing circuit 140) is determined. In operation S230, if the memory circuit is not being accessed by the other circuits, the firmware file is written to a first block (e.g., the memory block 503 in FIG. 5A) of memory blocks of the memory circuit according to the storage addresses.

Figure 3A:
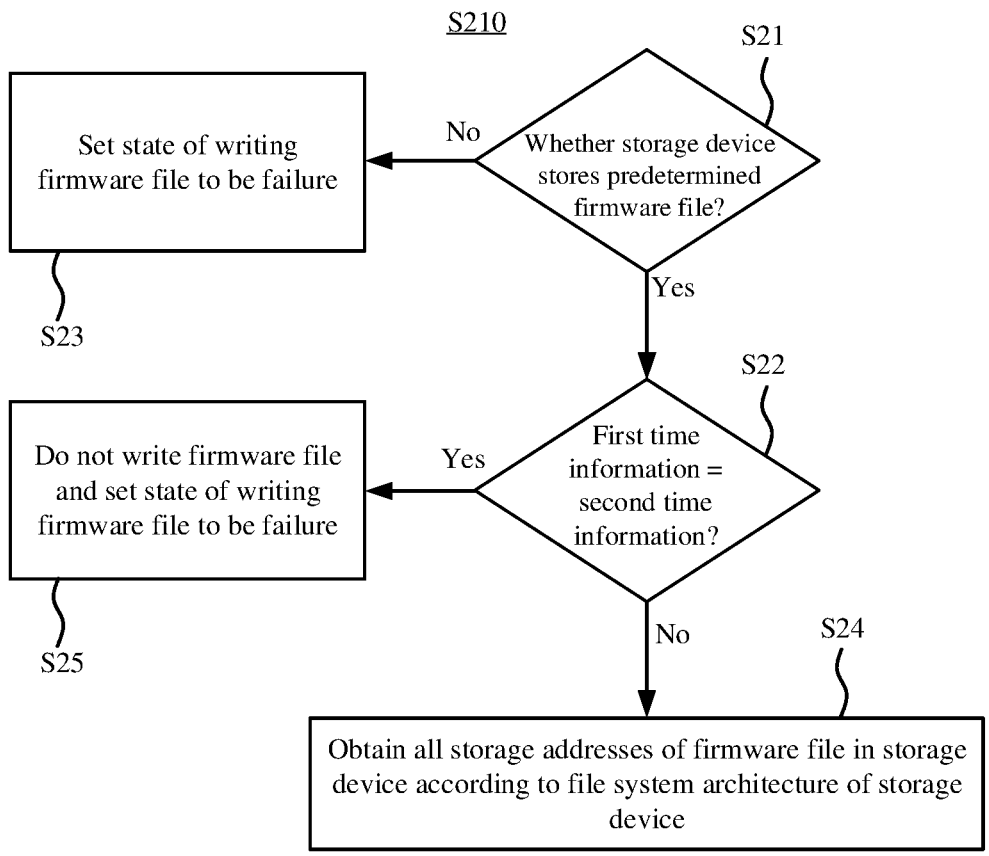
FIG. 3A illustrates a flow chart of an operation in FIG. 2 according to some embodiments of the present disclosure.

In order to illustrate operation S210 in FIG. 2, reference is made to FIG. 3A, and FIG. 3A illustrates a flow chart of operation S210 in FIG. 2 according to some embodiments of the present disclosure. Operation S210 includes steps S21-S25.

In step S21, whether the storage device (e.g., the storage device 100A) stores a predetermined firmware file (e.g., the firmware file D1) is determined. If the storage device 100A stores the predetermined firmware file, step S22 is performed. If the storage device 100A does not store the predetermined firmware file, step S23 is performed. In step S23, the state of writing firmware file is set to be failure.

For example, the host controller circuit 120 may determine whether the storage device 100A stores a file having a predetermined file name (i.e., the firmware file D1). If the storage device 100A stores the firmware file D1 having the predetermine file name, the host controller circuit 120 may perform step S22. Alternatively, if the storage device 100A does not store the firmware file D1 having the predetermined file name, the host controller circuit 120 may notify the microcontroller circuit 110 that the firmware updating cannot be performed. As a result, the microcontroller circuit 110 may issue the indication signal MS to the indicator unit 150, in order to notify a user that the firmware updating is failure.

In step S22, first time information corresponding to the firmware fie (e.g., the time information T1 corresponding to the firmware file D1) and second time information corresponding to the firmware file currently used by the embedded system (e.g., the time information T2 corresponding to the firmware file DF) are compared with each other. If the first time information are different from the second time information, step S24 is performed. If the first time information are equal to the second time information, step S25 is performed. In step S25, the firmware file is not written, and the state of writing the firmware file is set to be failure.

For example, if the memory circuit 130 previously stored the firmware file DF (i.e., the firmware file corresponding the firmware currently used by the embedded system 100, the microcontroller circuit 110 may establish the corresponding time information T2 according to attributes of the firmware file DF when the firmware file DF is received and store the time information T2 to the memory circuit 130. In some embodiments, the time information T2 may record information of the firmware file DF, which may include a creation time, a creation date, a modification time, a modification data, or the like and may be utilized to identify the firmware file DF. The host controller circuit 120 may read the firmware file D1 from the storage device 100A and establish the corresponding time information according to attributes of the firmware file D1. The time information T2 and the time information T1 have the same data format. For example, the time information T1 may record information of the firmware file D1, which may include a creation time, a creation date, a modification time, a modification data, or the like and may be utilized to identify the firmware file D1.

Accordingly, the host controller circuit 120 may compare the time information T1 with the time information T2. If the time information T1 are different from the time information T2, it indicates that the firmware file D1 to be updated is different from the currently used firmware file DF, and thus the host controller circuit 120 may perform step S24. Alternatively, if the time information T1 are equal to the time information T2, it indicates that the firmware file D1 to be updated is equal to the currently used firmware file DF. Under this condition, the currently used firmware file DF is not required to be updated, and thus the host controller circuit 120 may notify the microcontroller circuit 110 that the firmware updating is not performed. As a result, the microcontroller circuit 110 may issue the indication signal MS to the indicator unit 150, in order to notify the user that the firmware updating is over.

Figure 3B:
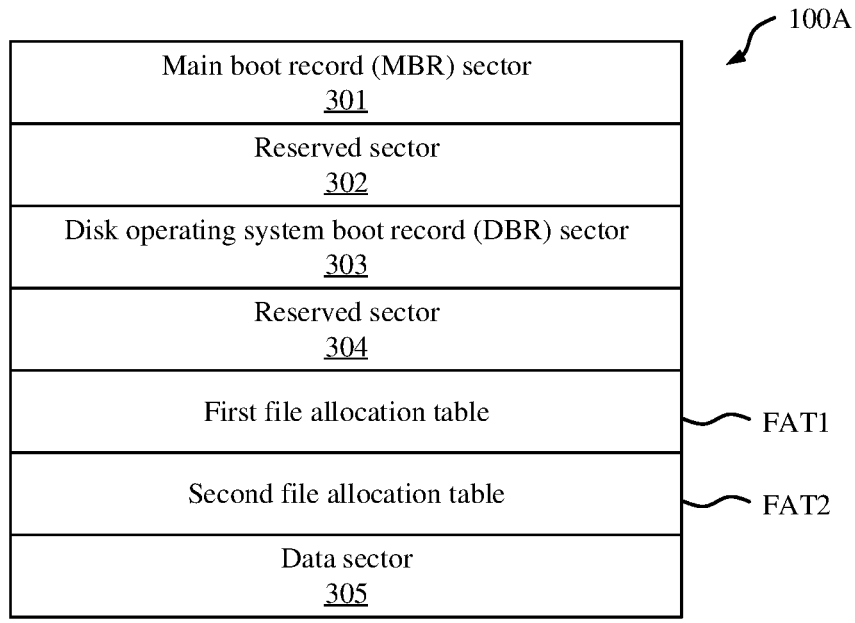
FIG. 3B illustrates of a schematic diagram of a file system of the storage device in FIG. 1 according to some embodiments of the present disclosure.

In step S24, all storage address of the firmware file in the storage device according to file system architecture of the storage device are obtained. In order to illustrate step S24, reference is made to FIG. 3B, and FIG. 3B illustrates of a schematic diagram of a file system of the storage device 100A in FIG. 1 according to some embodiments of the present disclosure. In different embodiments, the file system in the storage device 100A may be, but not limited to, a 32-bit file allocation table (also known as FAT32), an extended file allocation table (exFAT), a new technology file system (NTFS), and so on. For ease of understanding, examples shown in FIG. 3B are described with FAT32 to illustrate arrangements of the storage spaces in the storage device 100A.

As shown in FIG. 3B, the storage spaces in the storage device 100A may be divided into a main boot record (MBR) sector 301, a reserved sector 302, a disk operating system (DOS) boot record (DBR) sector 303, a reserved sector 304, a sector FAT1 (which stores a first file allocation table), a sector FAT2 (which stores a second file allocation table), and a data sector 305. The MBR sector 301 is located in fixed addresses of the storage spaces. The host controller circuit 120 may read data from the MBR sector 301 to obtain storage addresses of the DBR sector 303. In addition, the host controller circuit 120 may read data from the DBR sector 303, in order to obtain storages addresses and capacities of both of the sectors FAT1 and FAT2 and storage address of a root directory, in which the root directory is stored in the data sector 305. As a result, the host controller circuit 120 may search the root directory to find the firmware file D1 having the predetermined file name (similar to step S21), and may search the first file allocation table and the second file allocation table to obtain storage addresses corresponding to all data in the firmware file D1. With the above operations, the host controller circuit 120 may obtain all storage addresses of the firmware file D1 in the storage device 100A.

Figure 4:
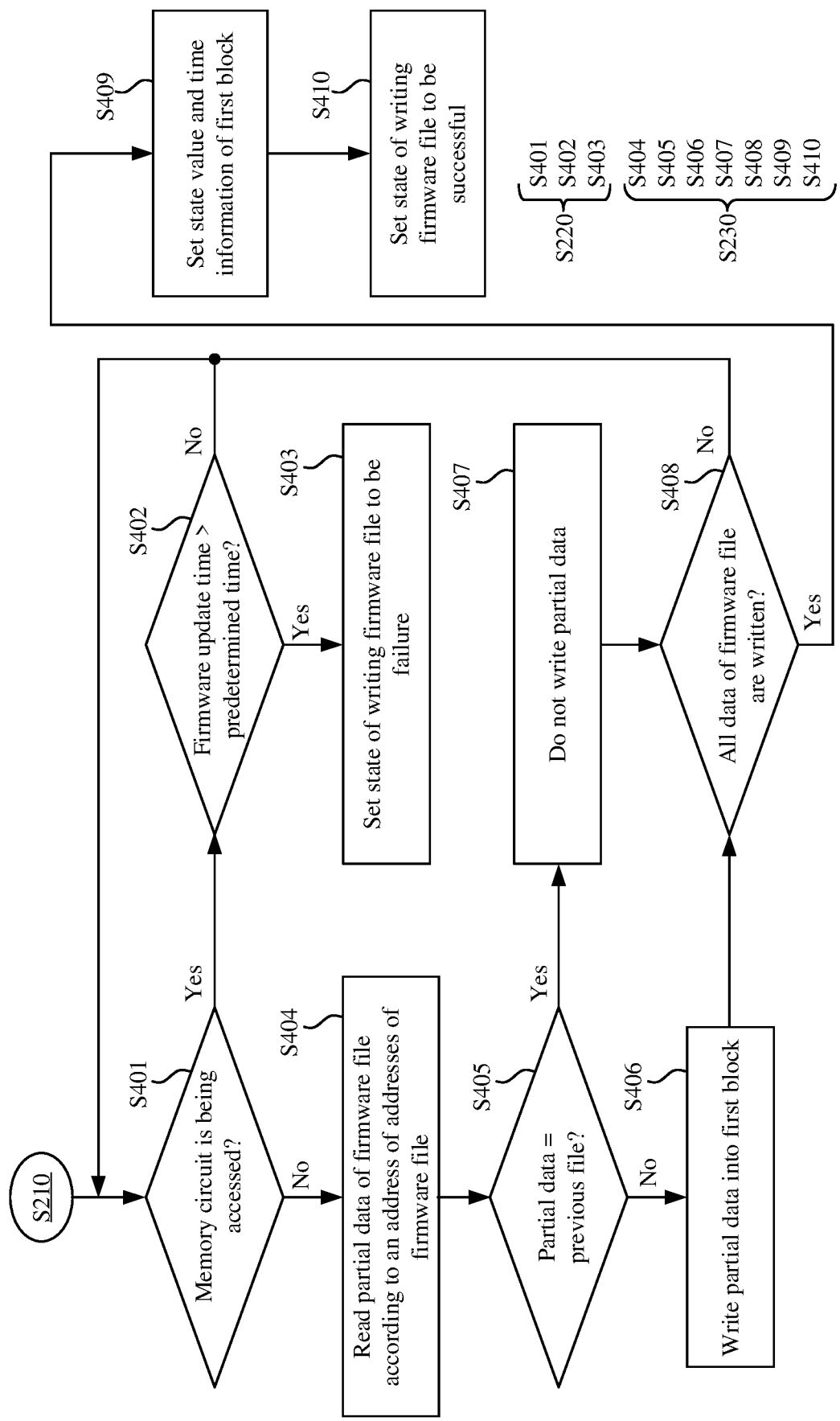
FIG. 4 illustrates a flow chart of two operations in FIG. 2 according to some embodiments of the present disclosure.

FIG. 4 illustrates a flow chart of operation S220 and operation S230 in FIG. 2 according to some embodiments of the present disclosure. In some embodiments, operation S220 includes steps S401-S403, and operation S230 includes steps S404-S410.

In step S401, whether the memory circuit is being accessed by other circuits is determined. If the memory circuit is not being accessed by other circuits, step S404 is performed. If the memory circuit is being accessed by other circuits, step S402 is performed. In step S402, whether the firmware update time is overdue is determined. If the firmware update time is not overdue, step S401 is performed again. Alternatively, if the firmware update time exceeds a predetermined time, step S403 is performed. In step S403, the state of writing firmware file is set to be failure.

For example, the microcontroller circuit 110 may read the at least one flag FG, in order to determine whether the memory circuit 130 is being accessed by the at least one signal processing circuit 140 (i.e., step S401). If the memory circuit 130 is not being accessed by any circuits in the at least one signal processing circuit 140, the microcontroller circuit 110 may determine that the memory circuit 130 is in an idle state and control the host controller circuit 120 to start writing the firmware file D1 to the memory circuit 130. Alternatively, if the memory circuit 130 is being accessed, the microcontroller circuit 110 may determine whether the current firmware update time exceeds the predetermined time (i.e., step S402). If the current firmware update time does not exceed the predetermined time, whether the memory circuit 130 is in the idle state is determined again. Alternatively, if the current firmware update time exceeds the predetermined time, the microcontroller circuit 110 may issue the indication signal MS to the indicator unit 150, in order to notify the user that the state of writing the firmware file D1 is failure (i.e., step S403). In some embodiments, the microcontroller circuit 110 may set an execution time of updating firmware by a counter or a timer. If the execution time exceeds the predetermined time, the indicator unit 150 may be utilized to notify the user to determine whether to re-update the firmware.

With continued reference to FIG. 4, in step S404, partial data in the firmware file are read according to an address in the addresses of the firmware file. In step S405, the partial data are compared with a previous file in the memory circuit. If the partial data are different from the previous file, step S406 is performed. If the partial data are the same as the previous file, step S407 is performed. In step S406, the partial data are written to a first block in the memory circuit 130 (e.g., memory block 503 in FIG. 5B). If the partial data are successfully written to the memory circuit 130, step S408 is performed. In step S407, the partial data are not written. In step S408, whether all data of the firmware file are written is determined. If all data of the firmware file are written, step S409 is performed. If all data of the firmware file are not written yet, step S401 is performed again, in order to read another partial data of the firmware file according to a next address in the addresses of the firmware file.

For example, the host controller circuit 120 may sequentially read data of the firmware file D1 from the storage device 100A according to the addresses. After a first data in the firmware file D1 (e.g., the partial data) are read, if the first block to be written (e.g., memory block 503 in FIG. 5B) stores a previous version of the firmware file (i.e., the previous file), the host controller circuit 120 may compare the first data with the previous file (i.e., step S405), and write the first data to the memory block when the first data are different from the previous file (i.e., step S406). If the first data are equal to the pervious file, the host controller circuit 120 does not write the first data to the memory block (i.e., step S407), and continues reading a second data of the firmware file D1, and perform the previous operations again, until all data in the firmware file D1 are written (i.e., step S408).

In some embodiments, the data amount of the partial data may be a minimum erase unit of the memory circuit 130. For example, the minimum erase unit may be, but not limited to, 4 k bytes. In a general case, the firmware updating (or upgrading) is commonly to adjust the previous firmware file (e.g., new instruction(s) or program code(s) are added to the previous firmware file, or instruction(s) or program code(s) in the previous firmware file are revised). With steps S405-S407, the previous version of the firmware file in the first block can be compared with the partial data of the firmware file D1 to be written to determine whether to write the partial data, in order to lower the number of times of the memory circuit 130 being erased. As a result, the service life of the memory circuit 130 can be extended. In other embodiments, the host controller circuit 120 may directly write the partial data of the memory circuit 130 without performing steps S405-S407.

In step S409, a state value and time information of the first block are set. In step S410, the state of writing the firmware file is set to be successful. Step S409 will be described with reference FIG. 5A and FIG. 5B. After step S408 is completed, it indicates that all data in the firmware file D1 are written to the first block of the memory circuit 130. In other words, the firmware of the embedded system 100 are updated. Under this condition, the microcontroller circuit 110 may issue the indication signal MS to the indicator unit 150, in order to notify the user that the state of writing the firmware file D1 is successful (i.e., step S410).

In some embodiments, if the partial data cannot be written to the first block successfully in step S406, it may determine whether a number of times of failing to write current data exceeds a predetermined value. If the number of times of failing to write current data exceeds the predetermined value, the state of writing the firmware file D1 is set to be failure. Alternatively, if the number of time of failing to write current data is not more than the predetermined value, step S401 is re-performed to try writing the partial data again. In some embodiments, the microcontroller circuit 110 may utilize a counter to count the number of times of failing to write data. If the number of times of failing to write data exceeds the predetermined value, the user is notified by the indicator unit 150 to determine whether to re-perform the firmware updating.

Figure 5A:
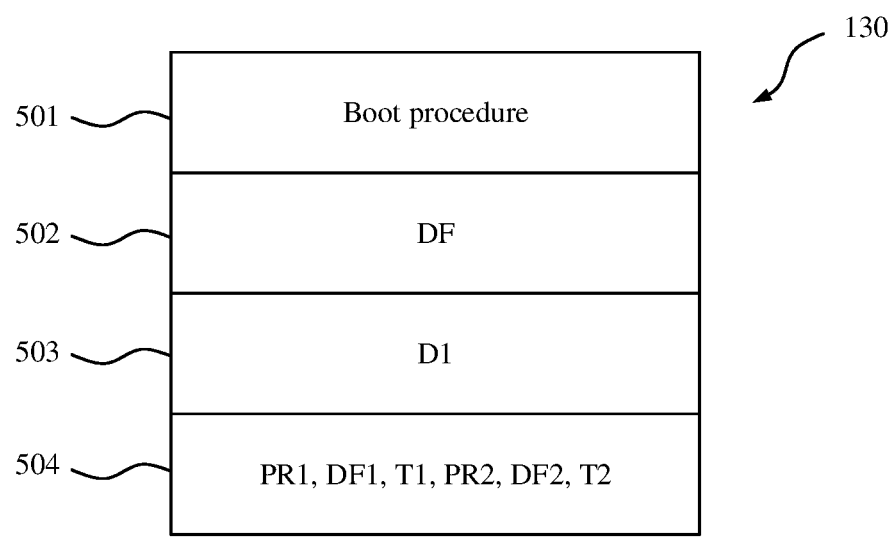
FIG. 5A illustrates a schematic diagram of memory blocks of the memory circuit in FIG. 1 according to some embodiments of the present disclosure.

FIG. 5A illustrates a schematic diagram of memory blocks of the memory circuit 130 in FIG. 1 according to some embodiments of the present disclosure. The memory circuit 130 includes memory blocks 501-504. The memory block 501 is configured to store data, instruction set(s), program code(s), or the like used in a boot procedure. The memory block 502 and the memory block 503 may store the firmware file. For example, the memory block 502 may store a previous firmware file DF, and the memory block 503 may store the firmware file D1. With the arrangements of the memory block 502 and the memory block 503, it can assure that during the operating of the embedded system 100, at least one memory block in the memory circuit 130, which is configured to store firmware file, is in an idle state. As a result, the host controller circuit 120 may utilize that memory block to perform firmware updating in background without affecting normal operations of the embedded system 100.

The memory block 504 may store flags corresponding to the memory block 502 and/or the memory block 503. For example, the flags include a priority value PR1, a state value DF1, and the time information T1 that correspond to the memory block 503, and a priority value PR2, a state value DF2, and the time information T2 that correspond to the memory block 502. The state value DF1 may indicate whether the firmware file stored in the memory block 503 (e.g., the firmware file D1) is successfully written. Similarly, the state value DF2 may indicate whether the firmware file stored in the memory block 502 (e.g., the firmware file DF) is successfully written. Furthermore, after the embedded system 100 is powered on, the microcontroller circuit 110 may read and execute the firmware file D1 in the memory block 503 or the firmware file DF in the memory block 502 according to the priority value PR1 and the priority value PR2. For example, if the priority value PR1 is higher than the priority value PR2, the microcontroller circuit 110 may read and execute the firmware file D1 corresponding to the priority value PR1. Alternatively, if the priority value PR2 is higher than the priority value PR1, the microcontroller circuit 110 may read and execute the firmware file DF corresponding to the priority value PR2.

In some embodiments, each of the state value DF1, the state value DF2, the priority value PR1, and the priority value PR2 originally has a predetermined value (e.g., 0xFF). After the firmware file D1 is completely written to the memory block 503 (e.g., the aforementioned first block), the microcontroller circuit 110 may set the state value DF1 to be another value (which may be, for example and not limited to, 0x01) that is different from the predetermined value, and update the time information T1 according to the attributes of the firmware file D1 (i.e., step S409). After the embedded system 100 is re-powered on, the microcontroller circuit 110 may perform operations in FIG. 5B according to the state value DF1, the state value DF2, the priority value PR1, and the priority value PR2, in order to read the firmware file D1 or the firmware file DF.

Figure 5B:
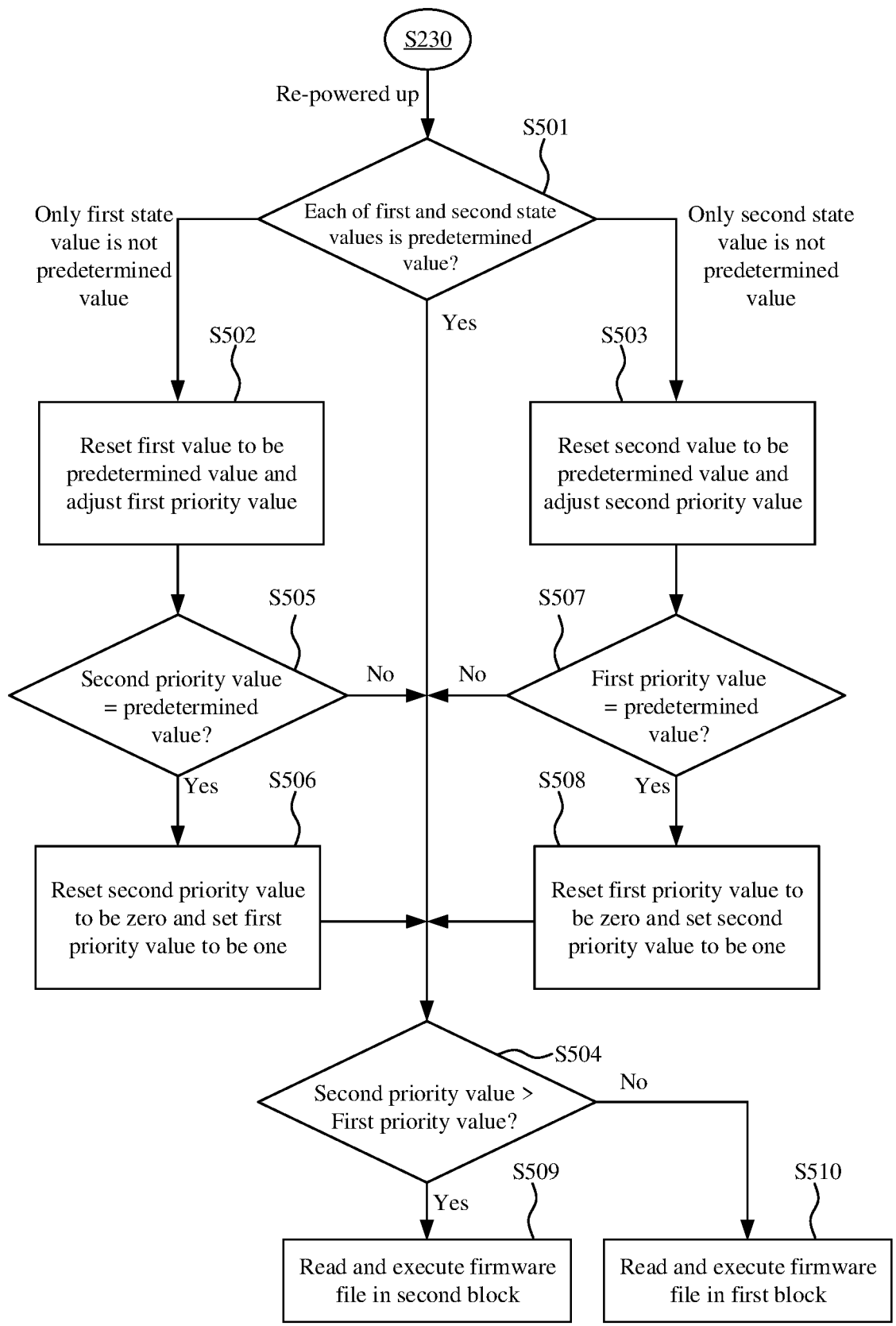
FIG. 5B illustrates a flow chart of reading the firmware file according to some embodiments of the present disclosure.

FIG. 5B illustrates a flow chart of reading the firmware file according to some embodiments of the present disclosure. In some embodiments, operations in FIG. 5B may be additional operations of the firmware updating method 200 in FIG. 2B. For example, operations in FIG. 5B may be subsequent operations that are performed after operation S230 in FIG. 2.

In operation S501, whether each of the first state value (e.g., the state value DF1) and the second state value (e.g., the state value DF2) has the predetermined value is determined. If the first state value is not the predetermined value and the second state value is the predetermined value, operation S502 is performed. If the second state value is not the predetermined value and the first state value is the predetermined value, operation S503 is performed. If each of the first state value and the second value is the predetermined value, operation S504 is performed.

In operation S502, the first state value is reset to be the predetermined value, and the first priority value is adjusted. In operation S505, whether the second priority value is the predetermined value is determined. If the second priority value is the predetermined value, operation S506 is performed. If the second priority value is not the predetermined value, operation S504 is performed. In operation S506, the second priority value is reset to be zero, and the first priority value is set to be one.

For example, as mentioned above, after the firmware file D1 is completely written to the memory block 503 (i.e., the first block), the microcontroller circuit 110 may set the state value DF1 to be another value that is different from the predetermined value (e.g., 0x01). After the embedded system 100 is re-powered on, the microcontroller circuit 110 may read the memory block 501 to perform the boot procedure. During the boot procedure, the microcontroller circuit 110 may determine that the state value DF1 is not the predetermined value and the state value DF2 is the predetermined value (e.g., 0xFF) (i.e., operation S501). Under this condition, it indicates that the firmware file D1 in the memory block 503 has been updated recently. Accordingly, the microcontroller circuit 110 may reset the state value DF1 to be the predetermined value and adjust the priority value PR1 corresponding to the memory block 503, such that, such that the priority value PR1 is higher than the priority value PR2 corresponding to the memory block 502 (i.e., operation S502). For example, the microcontroller circuit 110 may sum up the priority value PR2 with 1, in order to output the summation result as the priority value PR1. Afterwards, the microcontroller circuit 110 may determine whether the priority value PR2 is the predetermined value (e.g., 0xFF) (i.e., operation S505). In some embodiments, the predetermined value may be a maximum value of the priority value PR2 (or the priority value PR1). If the priority value PR2 is the predetermined value, the microcontroller circuit 110 may reset the priority value PR2 to be zero (e.g., 0x00), and set the priority value PR1 to be one (e.g., 0x01) (i.e., operation S506).

In operation S503, the second state value is reset to be the predetermined value and the second priority value is adjusted. In operation S507, whether the first priority value is the predetermined value is determined. If the first priority value is the predetermined value, operation S508 is performed. If the first priority value is not the predetermined value, operation S504 is performed. In operation S508, the first priority value is reset to be zero, and the second priority value is set to be one. Operation S503, operation S507, and operation S508 may be understood with reference to operation S502, operation S505, and operation S506, and thus the repetitious descriptions are not further given.

In operation S504, whether the second priority value is higher than the first priority value is determined. If the second priority value is higher than the first priority value, operation S509 is performed. If the second priority value is not higher than the first priority value, operation S510 is performed. In operation S509, the firmware file (e.g., the firmware file DF) in the second block (e.g., the memory block 502) is read and executed. In operation S510, the firmware file (e.g., the firmware file D1) in the first block (e.g., the memory block 503) is read and executed.

With the above operations, after the firmware updating is completed, the microcontroller circuit 110 may read and execute the firmware file D1 in the memory block 503 or the firmware file DF in the memory block 503 according to the priority value PR1 and the priority value PR2 during the boot procedure (i.e., operation S504). For example, after the firmware file D1 is completely written to the memory block 503, the priority value PR1 is adjusted to be higher than the priority value PR2. As the priority value PR1 is higher than the priority value PR2, the microcontroller circuit 110 may read and execute the firmware file D1 in the memory block 503 that corresponds to the priority value PR1 (i.e., operation S501). Alternatively, in other examples, if the firmware file DF in the second block (e.g., the memory block 502) is updated, the priority value PR2 is adjusted to be higher than the priority value PR1. As the priority value PR2 is higher than the priority value PR1, the microcontroller circuit 110 may execute the firmware file DF in the memory block 502 that correspond to the priority value PR2 (i.e., operation S509). Moreover, with the above operation, if the firmware updating process has failed (e.g., unexpected power outage), the embedded system 100 may read the previously stored firmware to run existing operations. As a result, the reliability of the embedded system 100 can be improved.

The above description of operations or steps in FIG. 2, FIG. 3A, FIG. 4, and FIG. 5B includes exemplary operations, but operations or steps in FIG. 2, FIG. 3A, FIG. 4, and FIG. 5B are not necessarily performed in the order described above. Operations or steps in FIG. 2, FIG. 3A, FIG. 4, and FIG. 5B can be added, replaced, changed order, and/or eliminated, or operations or steps in FIG. 2, FIG. 3A, FIG. 4, and FIG. 5B can be executed simultaneously or partially simultaneously as appropriate, in accordance with the spirit and scope of various embodiments of the present disclosure.

As mentioned above, in some operations or steps, the microcontroller circuit 110 may issue the indication signal MS, to control the indicator unit 150 to indicate the connection state of the storage device 100A and/or the state of writing the firmware file D1. In some embodiments, the indicator unit 150 may be an indicator light able to display three colors (e.g., yellow, green, and red), in which operating states that may be indicated by the indication light are listed in the following table 1:

| Operating states | | Indication light |
|---|---|---|
| Storage device 100A is disconnected | | No light |
| Storage device 100A is connected | Searching firmware file | Yellow light |
| | No firmware file found | Red light |
| | Writing firmware file | Yellow light flashing |
| | Writing succeeded | Green light |
| | Writing failed | Red light flashing |

As shown in table 1, with the indication light that displays three colors, a user may directly find out the operating states of the firmware updating procedure. According to practical applications, more switching states of the indication light can be employed to notify the user the corresponding operating state.

Alternatively, if the embedded system 100 is applied to a monitor, the indicator unit 150 may be an on-screen display (OSD) interface. The microcontroller circuit 110 may display the corresponding message via the OSD interface, in order to indicate the corresponding operating state. In some embodiments, the operating states able to be indicated by the OSD interface are listed in the following table 2:

| Operating states | | Messages displayed by OSD interface |
|---|---|---|
| Storage device 100A is disconnected | | Firmware update disabled |
| Storage device 100A is connected | Searching firmware file | Firmware update disabled |
| | No firmware file found | No available firmware file found |
| | Writing firmware file | Firmware updating |
| | Writing succeeded | Firmware update succeeded |
| | Writing failed | Firmware update failed |

In table 2, the message of "Firmware update disabled" indicates that the option of firmware updating in the OSD interface cannot be utilized. By showing the operating states by the OSD interface, the user can easily find out the operating states about firmware updating procedure. According to practical applications, more messages can be employed to notify the user the corresponding operating state. The types of the indicator unit 150 are given for illustrative purposes, and the present disclosure is not limited thereto.

As described above, the embedded system and the firmware updating method provided in some embodiments of the present disclosure may utilize common storage device(s) to perform the firmware updating, and the firmware updating procedure can be performed in background without affecting original operations of the embedded system. As a result, a user may perform the firmware updating without utilizing a firmware update tool having a specific interface or an additional computer, which makes the firmware update more convenient.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. An embedded system, comprising:
a host controller circuit configured to access a storage device to obtain an address of a first firmware file in the storage device; and
a microcontroller circuit configured to determine whether a memory circuit is being accessed by other circuits, wherein the memory circuit comprises a plurality of memory blocks, and if the memory circuit is not being accessed by the other circuits, the microcontroller circuit is further configured to control the host controller circuit to write the first firmware file to a first block of the plurality of memory blocks according to the address,
wherein if the first block stores a previous file, the host controller circuit is further configured to compare a partial data of the first firmware file with the previous file before the host controller circuit writes the partial data to the first block, and if the partial data are different from the previous file, the host controller circuit writes the partial data to the first block.

2. The embedded system of claim 1, wherein if the partial data are equal to the previous file, the host controller circuit does not write the partial data to the first block.

3. The embedded system of claim 1, wherein the microcontroller circuit is further configured to issue an indication signal to indicate a connection state of the storage device and a state of writing the first firmware file.

4. The embedded system of claim 1, wherein after the embedded system is powered up, the microcontroller circuit is further configured to read the first firmware file stored in the first block or a previous firmware file stored in a second block in the plurality of memory blocks according to a first priority value and a second priority value, the first block corresponds to the first priority value, and the second block corresponds to the second priority value.

5. The embedded system of claim 4, wherein the microcontroller circuit is further configured to determine whether each of a first state value and a second state value is a predetermined value, in order to determine whether to adjust the first priority value or the second priority value, the first block corresponds to the first state value, and the second block corresponds to the second state value.

6. The embedded system of claim 5, wherein after the first firmware file is written completely, the microcontroller circuit is further configured to set the first state value to be a value that is different from the predetermined value.

7. The embedded system of claim 1, wherein the host controller circuit is a universal serial bus (USB) host controller circuit.

8. A firmware updating method, comprising:
accessing, by a host controller circuit, a storage device to obtain an address of a first firmware file in the storage device;
determining whether a memory circuit is being accessed by other circuits, wherein the memory circuit comprises a plurality of memory blocks; and
writing, by the host controller circuit, the first firmware file to a first block of the plurality of memory blocks according to the address if the memory circuit is not being accessed by the other circuits,
wherein the host controller circuit and the memory circuit are arranged in an embedded system, and the firmware updating method further comprises:
after the embedded system is powered up, reading the first firmware file stored in the first block or a previous firmware file stored in a second block in the plurality of memory blocks according to a first priority value and a second priority value,
wherein the first block corresponds to the first priority value, and the second block corresponds to the second priority value.

9. The firmware updating method of claim 8, wherein writing, by the host controller circuit, the first firmware file to the first block according to the address if the memory circuit is not being accessed by the other circuits comprises:

if the first block stores a previous file, comparing a partial data of the first firmware file with the previous file before the partial data are written to the first block; and if the partial data are different from the previous file, writing, by the host controller circuit, the partial data to the first block.

10. The firmware updating method of claim 9, wherein if the partial data are equal to the previous file, the partial data are not written to the first block.

11. The firmware updating method of claim 8, wherein accessing, by the host controller circuit, the storage device to obtain the address of the first firmware file in the storage device comprises:

accessing the storage device to obtain first time information relevant to the first firmware file, wherein the memory circuit further stores second time information relevant to a current firmware file; and comparing the first time information with the second time information, in order to determine whether to write the first firmware file to the first block.

12. The firmware updating method of claim 11, further comprising:

if the first time information are different from the second time information, writing the first firmware file to the first block according to the address, wherein the first firmware file is not written to the first block if the first time information are equal to the second time information.

13. The firmware updating method of claim 8, further comprising:

issuing an indication signal to indicate a connection state of the storage device and a state of writing the first firmware file.

14. The firmware updating method of claim 8, further comprising:

determining whether each of a first state value and a second state value is a predetermined value, in order to determine whether to adjust the first priority value or the second priority value, wherein the first block corresponds to the first state value, and the second block corresponds to the second state value.

15. The firmware updating method of claim 14, further comprising:

after the first firmware file is written completely, setting the first state value to be a value that is different from the predetermined value.

16. The firmware updating method of claim 8, wherein the host controller circuit is a universal serial bus (USB) host controller circuit.

17. An embedded system, comprising:

a host controller circuit configured to access a storage device to obtain an address of a first firmware file in the storage device; and a microcontroller circuit configured to determine whether a memory circuit is being accessed by other circuits, wherein the memory circuit comprises a plurality of memory blocks, and if the memory circuit is not being accessed by the other circuits, the microcontroller circuit is further configured to control the host controller circuit to write the first firmware file to a first block of the plurality of memory blocks according to the address, the host controller circuit is further configured to access the storage device to obtain first time information relevant to the first firmware file, the memory circuit further stores second time information relevant to a current firmware file, and the host controller circuit is further configured to compare the first time information with the second time information, in order to determine whether to write the first firmware file to the first block.

18. The embedded system of claim 17, wherein if the first time information are different from the second time information, the host controller circuit is configured to write the first firmware file to the first block according to the address, and if the first time information are equal to the second time information, the host controller circuit does not write the first firmware file to the first block.

* * * * *